United States Patent
Simileysky

(10) Patent No.: US 10,341,865 B2
(45) Date of Patent: Jul. 2, 2019

(54) DISTANCE ESTIMATION AND AUTHENTICATION FOR BLUETOOTH SYSTEMS, AND DEVICES

(71) Applicant: Cypress Semiconductor Corporation, San Jose, CA (US)

(72) Inventor: Victor Simileysky, San Jose, CA (US)

(73) Assignee: Cypress Semiconductor Corporation, San Jose, CA (US)

( * ) Notice: Subject to any disclaimer, the term of this patent is extended or adjusted under 35 U.S.C. 154(b) by 0 days.

(21) Appl. No.: 15/852,909

(22) Filed: Dec. 22, 2017

(65) Prior Publication Data

US 2019/0110196 A1 Apr. 11, 2019

Related U.S. Application Data

(60) Provisional application No. 62/568,929, filed on Oct. 6, 2017.

(51) Int. Cl.
*H04W 12/06* (2009.01)
*H04W 4/80* (2018.01)
*H04W 4/02* (2018.01)
*G01S 5/02* (2010.01)

(52) U.S. Cl.
CPC ........... *H04W 12/06* (2013.01); *G01S 5/0294* (2013.01); *H04W 4/023* (2013.01); *H04W 4/80* (2018.02)

(58) Field of Classification Search
CPC ..... H04W 12/06; H04W 4/008; H04W 4/023; G01S 5/0294
USPC ........................................ 455/41.2, 410–411
See application file for complete search history.

(56) References Cited

U.S. PATENT DOCUMENTS

| | | | |
|---|---|---|---|
| 7,672,283 B1* | 3/2010 | Chang | H04W 12/12 370/338 |
| 7,962,150 B2 | 6/2011 | Hertzog et al. | |
| 8,228,171 B2 | 7/2012 | Bauchot et al. | |
| 8,786,488 B2 | 7/2014 | Gravelle et al. | |
| 8,947,236 B2 | 2/2015 | Forster | |
| 9,204,257 B1 | 12/2015 | Mendelson | |
| 9,285,457 B2 | 3/2016 | Aryanfar et al. | |
| 9,369,160 B2 | 6/2016 | Barott | |
| 9,519,812 B2 | 12/2016 | Bassan-Eskenazi et al. | |
| 9,654,912 B2 | 5/2017 | Schatzberg et al. | |
| 2010/0172259 A1* | 7/2010 | Aggarwal | H04L 63/1466 370/252 |
| 2015/0271667 A1 | 9/2015 | Bernsen | |

(Continued)

OTHER PUBLICATIONS

Farid, Zahid, "Recent Advances in Wireless Indoor Localization Techniques and Systems," Journal of Computer Networks and Communications, vol. 2013, Article ID 185138, pp. 1-13; 13 pages.

(Continued)

*Primary Examiner* — Michael Y Mapa

(57) ABSTRACT

Distance estimation and authentication are provided for Bluetooth systems and devices. Proximity detection requests are transmitted using a transceiver of a tracking device. Reply messages are received from a tracked device. Designated delay values are generated, and round trip times associated with the reply messages are determined based, at least in part, on the designated delay values and time stamps associated with the reply messages. An authenticity metric associated with the tracked device is generated based, at least in part, on the round trip times.

17 Claims, 5 Drawing Sheets

(56) References Cited

U.S. PATENT DOCUMENTS

2016/0352605 A1* 12/2016 O'Donoghue ...... H04L 43/0864
2017/0238140 A9   8/2017 Buchheim et al.

OTHER PUBLICATIONS

International Search Report for International Application No. PCT/US18/47268 dated Oct. 1, 2018; 2 pages.
Written Opinion of the International Searching Authority for International Application No. PCT/US18/47268 dated Oct. 1, 2018; 14 pages.

* cited by examiner

DISTANCE ESTIMATION AND AUTHENTICATION FOR BLUETOOTH SYSTEMS, AND DEVICES

CROSS-REFERENCE TO RELATED APPLICATIONS

This application claims the benefit under 35 U.S.C. § 119(e) of U.S. Provisional Patent Application No. 62/568,929, filed on Oct. 6, 2017, which is incorporated by reference herein in its entirety for all purposes.

TECHNICAL FIELD

This disclosure generally relates to authentication and, more specifically, to authentication between tracking devices and tracked devices.

BACKGROUND

Hardware devices may include tracking devices and tracked devices. Such hardware devices are configured to communicate with each other wirelessly using various wireless communications techniques. For example, hardware devices may include transmitters and receivers that may utilize wireless antennas or radios to transmit and receive messages. Examples of such devices may include beacons that broadcast messages to nearby devices such as tags. Pairings between such beacons and tags may be used to implement various functionalities, such as triggering a location-based action.

DETAILED DESCRIPTION

In the following description, numerous specific details are set forth in order to provide a thorough understanding of the presented concepts. The presented concepts may be practiced without some or all of these specific details. In other instances, well known process operations have not been described in detail so as to not unnecessarily obscure the described concepts. While some concepts will be described in conjunction with the specific examples, it will be understood that these examples are not intended to be limiting.

As discussed above, hardware devices may include tracking devices and tracked devices that are configured to communicate with each other wirelessly using various wireless communications techniques. For example, hardware devices may include transmitters and receivers that may utilize wireless radios such as Bluetooth radios. In some embodiments, such devices may include beacons that broadcast messages to nearby devices such as tags. As also discussed above, pairings between such beacons and tags may be used to implement various functionalities and/or operations, such as access to secure locations or areas. In a specific example, a beacon may be located in a user's car, and a tag may be incorporated in a user's key fob. Accordingly, the beacon may be configured to unlock the user's car when the beacon is detected within a certain proximity.

However, some implementations of beacons and tags are limited because such beacons do not provide sufficient authentication for associated tags. Accordingly, such beacons are susceptible to being fooled by other tags or devices which may have spoofed identities or imitated identification information. Returning to a previous example, another entity may have managed to obtain or replicate the identifier of the tag, and may attempt to use such replicated information to obtain access to the user's car.

Various systems, devices, and methods disclosed herein provide additional authentication between tracked devices and tracking devices to increase the security of communication between the two, as well as operations and actions implemented based on such communications. As will be discussed in greater detail below, a tracking device may send messages to a tracked device, and such messages may be proximity detection requests. The tracked device is configured to implement a delay before sending a reply message for each request. The tracking device is configured to receive the replies and determine if the delays implemented by the tracked device are correct. If they are correct, then the tracked device may be identified as authentic. If they are not correct, then authentication may fail. In this way, tracking devices and tracked devices are configured to implement time-deferred scrambling for additional authentication between tracking devices and tracked devices.

Figure 1:
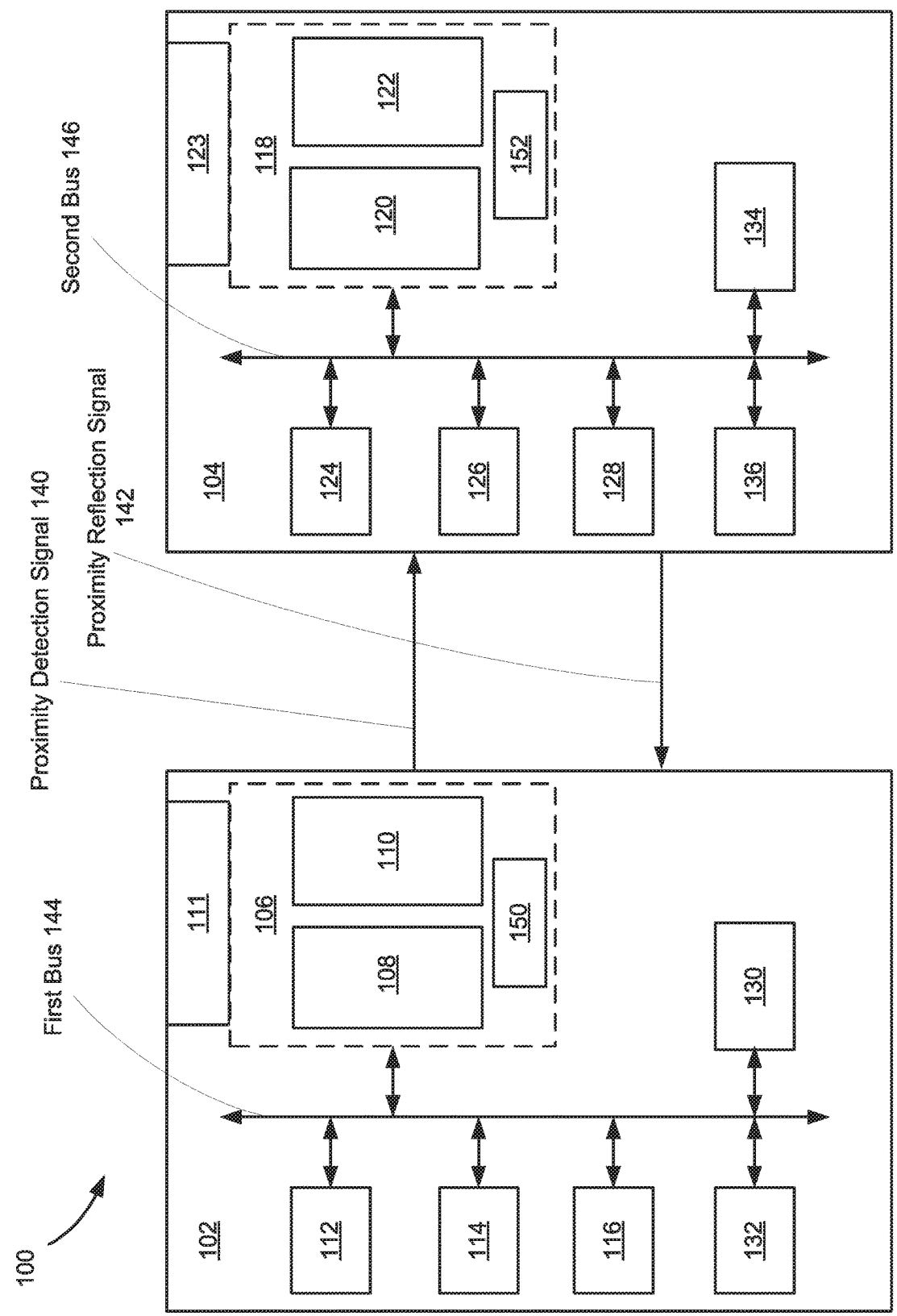
FIG. 1 illustrates an example of a system for secure authentication between a tracking device and a tracked device, configured in accordance with some embodiments.

FIG. 1 illustrates an example of a system for secure authentication between a tracking device and a tracked device. As will be discussed in greater detail below, systems and devices disclosed herein are configured to implement secure authentication to enable accurate identification and proximity detection of a tracked device by a tracking device. In one example, a tracking device may be a beacon, and a tracked device may be a tag. Accordingly, systems and devices disclosed herein enable the beacon to identify the tag, and determine a proximity or distance between the beacon and the tag in a manner that reduces the ability of other devices to imitate or spoof the identity of the tag.

System 100 includes a tracking device, such as tracking device 102. As will be discussed in greater detail below, according to various embodiments, tracking device 102 is a beacon configured to implement one or more wireless communications modalities to communicate with and track a location of one or more devices. More specifically, tracking device 102 may broadcast an identifier to one or more tracked devices, and such tracked devices may transmit a reply that may be used, for example, to identify the tracked devices as well as one or more features of the tracked devices, such as a proximity, distance, or physical location. In one example, tracking device 102 is a Bluetooth low energy beacon that is configured to communicate with tracked devices using a Bluetooth radio.

In some embodiments, tracking device 102 includes first transceiver 106 which is configured to transmit one or more data values broadcast by tracking device 102. First transceiver 106 is also configured to receive one or more data values which may be transmitted by tracked devices. Such data values may be transmitted and received via one or more wireless protocols, and such data values may be included in messages or packets configured in accordance with such wireless protocols. In one example, first transceiver 106 is implemented as a component in a Bluetooth radio. Furthermore, first transceiver 106 includes first transmitter 108 configured to transmit data values, and further includes first receiver 110 configured to receive data values. In various embodiments, tracking device 102 further includes first antenna 111 which is coupled to first transceiver 106, and is configured to enable wireless transmission and reception to and from tracked devices, such as tracked device 104 discussed in greater detail below.

In various embodiments, tracking device 102 further includes first packet processor 150 which is configured to packetize data for transmission via first transceiver 106. More specifically, first packet processor 150 is configured to convert messages, such as a proximity detection request, into packets capable of transmission via a communications network. In one example, first packet processor 150 is a Bluetooth packet processor that is configured to convert a proximity detection request into Bluetooth data packets for transmission via the Bluetooth communications protocol. In various embodiments, first packet processor 150 is also configured to generate or assemble messages based on received packets. In this way, first packet processor 150 enables, at least in part, first transceiver 106 to operate as a Bluetooth radio that packetizes, transmits, and receives data in accordance with Bluetooth communications protocols. While FIG. 1 illustrates first packet processor 150 implemented within first transceiver 106, it will be appreciated that first packet processor 150 may instead be implemented outside of and independent of first transceiver 106, and may be communicatively coupled with first transceiver 106 via first bus 144.

In some embodiments, tracking device 102 includes time of flight (ToF) analyzer 112 which is configured to determine a time of flight of a signal. In various embodiments, the ToF characterizes a time taken for a transmitted signal to travel from tracking device 102 to tracked device 104 or visa versa. Accordingly, the ToF may also be used to determine a round trip time (RTT) which represents a total amount of time taken for a signal to travel from tracking device 102 to tracked device 104, and to return from tracked device 104 to tracking device 102. In various embodiments, ToF analyzer 112 includes analog and/or digital processing logic and circuitry configured to implement the ToF determinations described herein. In a specific example, ToF analyzer 112 is implemented as part of a System on Chip (SoC). In one example, RTT may be determined based on equation 1 shown below:

$$RTT = (ToA1 - ToD1) - (ToD2 - ToA2) \quad (1)$$

In equation 1, ToD1 is a time at which a signal, such as proximity detection signal 140, which may include one or more data values in a message, is transmitted, or departs, from tracking device 102. ToA2 is a time at which the signal is received, or arrives, at tracked device 104. ToD2 is a time at which a reply signal, such as proximity reflection signal 142, that may include a reply message, is transmitted, or departs, from tracked device 104. ToA1 is a time at which the reply message is received, or arrives, at tracking device 102. In various embodiments, ToA1, ToD1, ToD2, and ToA2 are identified based on time stamps generated by tracking device 102 and tracked device 104 respectively, and such timestamps may be embedded within the messages as well as stored in a memory device of tracking device 102 and tracked device 104, such as memory 130 and memory 134. In various embodiments, such memory devices may also be configured to store additional information such as firmware, data tables, and operands associated with authentication operations.

In some embodiments, values of ToD2 and ToA2 might not be known to tracking device 102, and ToF analyzer 112 may instead utilize equation 2 shown below, which may be corrected as discussed in greater detail below with reference to delay compensator 114. Thus, according to some embodiments, ToF analyzer 112 is configured to compute an RTT value based on a time stamp identifying a time when a proximity detection request was sent, and a time stamp identifying at time when a reply message was received, as shown below:

$$RTT = (ToA1 - ToD1) \quad (2)$$

In various embodiments, tracking device 102 includes delay compensator 114 which is configured to remove a delay component from a determined round trip time. As will be discussed in greater detail below, a tracked device, such as tracked device 104, is configured to implement one or more predetermined delays to provide additional authentication between tracking device 102 and tracked device 104. Accordingly, delay compensator 114 is configured to determine a delay as well as a corrected round trip time based on the RTT calculated by ToF analyzer 112 as well as a delay determined by delay generator 116 discussed in greater detail below. In some embodiments, delay compensator 114 is configured to subtract the delay identified by delay generator 116 from the RTT computed by ToF analyzer 112 to identify a corrected RTT and to recover the unscrambled value. In this way, the determination of the corrected RTT values may be adjusted based on the determined designated delay values and associated time delays as well as time stamp information associated with the transmitted and received messages. As will be discussed in greater detail below, the corrected RTT may be used to determine a proximity of tracked device 104. In various embodiments, delay compensator 114 includes analog and/or digital processing logic and circuitry configured to implement the delay and RTT determinations described herein. In a specific example, delay compensator 114 is implemented as part of a System on Chip (SoC).

Additional details are provided below with reference to equation 3-5 shown below. In equation 3, T_Occupancy is defined as a total amount of time between a message arriving at a tracked device (ToA2) and the reply message being transmitted, or departing, from the tracked device (ToD2). Furthermore, as shown in equation 4 below, T_Occupancy may be further represented as the combination of Tconst and Tkey, where Tconst is an estimate of a time spent by tracked device for processing and computations associated with generation and transmission of a reply message, and where Tkey is a designated delay value generated by a delay generator. In various embodiments, the value of Tconst may have been previously determined, or may have been determined during an initial configuration operation based on previous observations and measurements.

$$ToD2 - ToA2 = T\_Occupancy \quad (3)$$

$$T\_Occupancy = Tconst + Tkey \quad (4)$$

Accordingly, the corrected RTT may be determined based on equation 5 shown below. In this way, delay compensator 114 may determine a corrected RTT, and may obtain a designated delay value (Tkey) from delay generator 116.

$$eRTT_i = (ToA1_i - ToD1_i) - Tconst - Tkey_i \quad (5)$$

In some embodiments, tracking device 102 includes delay generator 116 which is configured to generate a designated delay value, or a sequence of designated delay values in a secure and deterministic manner. As will also be discussed in greater detail below, delay generator 116 is further configured to generate associated time delay values as well. In one example, delay generator 116 is configured to generate a sequence of designated delay values using a key that may have been exchanged with tracked device 104. In this example, delay generator 116 may utilize the key to generate a sequence of key values, such as $Tkey_1, Tkey_2, \ldots, Tkey_N$, and such sequence of key values may be generated deterministically and unique to the key shared between tracking device 102 and tracked device 104. For example, a series of key values may be generated based on the key using different hash functions. In another example, the series of key values are generated using a deterministic scrambling function or a deterministic random number generator. In such an example, the deterministic random number generator may deterministically generate a series of key values based on a seed state that is determined based on the originally share key. Moreover, as will be discussed in greater detail below, tracked device 104 may have a paired or complimentary deterministic random number generator as well and is configured to generate key values in the same manner. In yet another example, the key values themselves may have each been previously generated as separate keys, and the separate keys may be provided to tracking device 102 and tracked device 104 during a synchronization event and/or an initial configuration operation.

It will be appreciated that any suitable technique for deterministically generating the key values may be implemented. Moreover, it will be appreciated that any suitable cryptographic cypher may be used to generate the key. For example, AES-CCM or AES-GCM cyphers may be used. In some embodiments, the key or sequence of keys may be exchanged via a secure connection.

Accordingly, the series of key values may be generated in a deterministic manner, and they may be mapped to a series of time delay values by delay generator 116 which is communicatively coupled with memory 130. In some embodiments, the mapping may also be implemented in a deterministic manner. Thus, key values may be mapped to particular time values identifying an amount of time to implement as a delay. In various embodiments, such mapping may be implemented using a lookup table stored in a memory, such as memory 130. In some embodiments, the key values may be of a particular length or size, and the look up table may be configured to map ranges of such values to particular times. In another example, the key values may be used as the time values. For example, a key value may be a number, and such a number may be used as an amount of time which may be, for example, nanoseconds or milliseconds. In this way designated delay values that are key values may be mapped or translated to time delay values. Such time delay values may be used in the computations discussed above with reference to delay compensator 114. In various embodiments, delay generator 116 includes analog and/or digital processing logic and circuitry configured to implement the generation of delay values described herein. In a specific example, delay generator 116 is implemented as part of a System on Chip (SoC).

As will be discussed in greater detail below, the key exchange between tracking device 102 and tracked device 104 may occur during an initial configuration of both devices, or during a synchronization event which may be a synchronization operation that occurs periodically between tracking device 102 and tracked device 104. In various embodiments, the generation of the delays in this manner ensures that it is difficult for a different device to predict and spoof Tkey values.

In various embodiments, tracking device 102 further includes first processor 132 which is configured to implement one or more authentication operations. For example, first processor 132 may be configured to generate messages, such as proximity detection requests, for transmission via first transmitter 108, as well as determine how many messages should be sent and when, as will be discussed in greater detail below with reference to FIG. 3 and FIG. 4. First processor 132 may be configured to implement other operations as well, such as the generation of time stamp data, the storage of such data in memory 130, as well as one or more other computations, such as proximity and distance determinations as well as authentication determinations that may include the generation of an authenticity metric. In various embodiments, an authenticity metric is a metric that characterizes whether or not a tracked device is determined to be authentic. In one example, an authenticity metric may be a binary value or a flag that characterizes a result of the authentication determinations discussed in greater detail below. Accordingly, first processor 132 may be configured to generate the authenticity metric based, at least in part, on delays and round trip times associated with reply messages. In various embodiments, tracking device 102 further includes first bus 144 which is configured to enable communication between components of tracking device 102.

System 100 further includes a tracked device, such as tracked device 104. As discussed above, tracked device 104 may be a low energy device such as a tag configured to communicate with a beacon. As will be discussed in greater detail below, tracked device 104 is configured to generate a reply message, also referred to herein as a reflection message, based, at least in part, on a message broadcast from tracking device 102. In various embodiments, tracked device 104 has an associated unique identifier configured to identify tracked device 104 to tracking device 102.

In some embodiments, tracked device 104 includes second transceiver 118 which is configured to receive one or more data values broadcast by tracking device 102. Second transceiver 118 is also configured to transmit one or more data values which may include a reply message generated based, at least in part, on the data values received from tracking device 102. Such data values may be transmitted and received via one or more wireless protocols. As similarly discussed above, second transceiver 118 may be implemented as a component in a Bluetooth radio. In various embodiments, second transceiver 118 includes second transmitter 120 configured to transmit data values, and further includes second receiver 122 configured to receive data values. In various embodiments, tracked device 104 further includes second antenna 123 which is coupled to second transceiver 118, and is configured to enable wireless transmission and reception to and from tracked device 104.

In various embodiments, tracked device 102 further includes second packet processor 152 which is configured to handle packet processing for data transmitted and received via second transceiver 118. More specifically, second packet processor 152 is configured to convert messages, such as a reply messages that may be reflected proximity detection requests, into packets capable of transmission via a communications network. In one example, second packet processor 152 is a Bluetooth packet processor that is configured to convert reply messages into Bluetooth data packets for transmission via the Bluetooth communications protocol. In various embodiments, second packet processor 152 is also configured to generate or assemble messages based on received packets, such as those that may be received for a proximity detection request received at tracked device 104. In this way, second packet processor 152 enables, at least in part, second transceiver 118 to operate as a Bluetooth radio that packetizes, receives, and transmits data in accordance with Bluetooth communications protocols. While FIG. 1 illustrates second packet processor 152 implemented within second transceiver 118, it will be appreciated that second packet processor 152 may instead be implemented outside of and independent of second transceiver 118, and may be communicatively coupled with second transceiver 118 via second bus 146.

In some embodiments, tracked device 104 includes delayed reflector 124 which is configured to generate a reply message, also referred to herein as a reflected message, for transmission back to tracking device 102. Moreover, delayed reflector 124 is configured to send the message after a delay has been implemented, where such a delay is determined based on a designated delay value discussed in greater detail below with reference to delay generator 128. As will be discussed in greater detail below, delayed reflector 124 is also configured to identify proximity detection requests, and generate reply messages responsive to the identification of such proximity detection requests. In some embodiments, delayed reflector 124 is configured to identify proximity detection requests based on Bluetooth packet fields included in packets received at second transceiver 118. In various embodiments, delayed reflector 124 includes analog and/or digital processing logic and circuitry configured to implement the generation of a reply message as described herein. In a specific example, delayed reflector 124 is implemented as part of a System on Chip (SoC).

In some embodiments, tracked device 104 includes delay control 126 which is configured to command delayed reflector 124 to implement a delay of a designated amount of time. Accordingly, delay control 126 is configured to identify a designated delay value and a time delay that have been determined by delay generator 128 discussed below, and is further configured to generate a command signal that commands delayed reflector 124 to implement the time delay associated with the identified designated delay value prior to sending the reflected response. In various embodiments, delay control 126 includes analog and/or digital processing logic and circuitry configured to implement the identification of delays and command of delayed reflector 124 described herein. In a specific example, delay control 126 is implemented as part of a System on Chip (SoC).

In some embodiments, tracked device 104 includes delay generator 128 which is configured to generate a designated delay value, or a sequence of designated delay values in a secure and deterministic manner. As similarly discussed above, delay generator 128 is configured to generate a sequence of delay values using a key that may have been exchanged with tracking device 102. As also discussed above, delay generator 128 may utilize the key to generate a sequence of key values, such as $Tkey_1, Tkey_2, \ldots, Tkey_N$, and such sequence of key values may be generated deterministically and unique to the key shared between tracking device 102 and tracked device 104, and may be mapped to a series of time delay values. Accordingly, a designated delay value and time delay may be computed and may be provided to delay control 126 and delayed reflector 124 to implement the delay prior to transmission of the reply message. In various embodiments, delay generator 128 includes analog and/or digital processing logic and circuitry configured to implement the generation of designated delay values described herein. In a specific example, delay generator 128 is implemented as part of a System on Chip (SoC).

Tracked device 104 also includes second processor 136 which is configured to implement one or more communication and authentication operations. For example, second processor 136 may be configured to implement synchronization events and configuration operations, generate time stamp data, and to store such data in memory 134. In various embodiments, tracked device 104 further includes second bus 146 which is configured to enable communication between components of tracked device 104.

Additional details of tracked device 104 are discussed in greater detail below with reference to FIG. 2. Moreover, while FIG. 1 illustrates one tracked device, system 100 may be implemented with multiple tracked devices. Accordingly, tracking device 102 may be configured to support secure authentication with multiple different tracked devices. Furthermore, while various embodiments disclosed herein have been described with reference to Bluetooth radios, it will be appreciated that other communications and tracking modalities may be implemented as well. For example, tracking device 102 and tracked device 104 may be implemented using radio-frequency identification (RFID) in which tracked device 104 is a RFID tag that may be active or passive, and tracking device 102 is an RFID reader.

As discussed above, components of tracking device 102 and tracked device 104 may be implemented by processing logic comprising hardware (circuitry, dedicated logic, etc.), software (such as is run on a general purpose computing system or a dedicated machine), firmware (embedded software), or any suitable combination thereof. In various embodiments, components such as ToF analyzer 112, delay compensator 114, delay generator 116 may be implemented in a first logic device. Moreover, delayed reflector 124, delayed control 126, and second delay generator may be implemented in a second logic device. In some embodiments, the first logic device and the second logic device may be logic devices provided by Cypress Semiconductor of San Jose, Calif. In some embodiments, such logic devices may be reprogrammable logic devices. Furthermore, in some embodiments, tracked device 104 may be configured as a tracking device, and tracking device 102 may be configured as a tracked device. Accordingly, tracking device 102 and tracked device 104 may be configured such that their functionalities are switched. Moreover, while some embodiments are discussed in the context of secure access to automobiles using associated key fobs, embodiments disclosed herein may be implemented in any suitable wireless context with associated wireless devices and systems.

Figure 2:
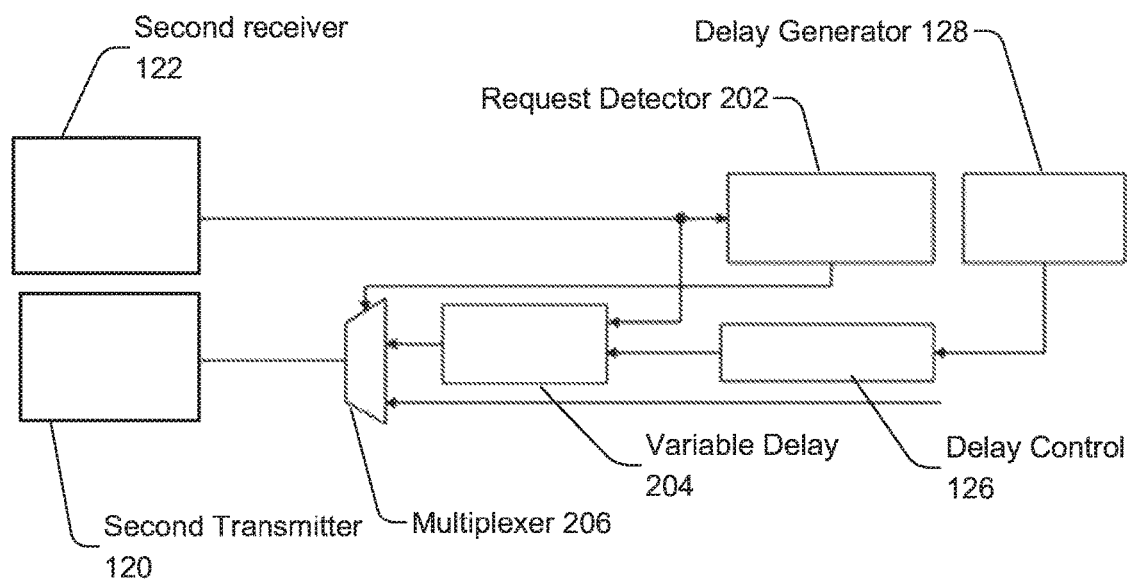
FIG. 2 illustrates another example of a tracked device, configured in accordance with some embodiments.

FIG. 2 illustrates another example of a tracked device, configured in accordance with some embodiments. As similarly discussed above, tracked device 104 may include second transmitter 120, second receiver 122, delay generator 128, and delay control 126. In FIG. 2, additional details are shown regarding delayed reflector 124. For example, delayed reflector 124 may be implemented as request detector 202 and variable delay 204. In various embodiments, request detector 202 is configured to identify a request sent from tracking device 102 and received via second receiver 122. As similarly discussed above, in some embodiments, request detector 202 is configured to identify requests based on Bluetooth packet fields of Bluetooth packets received at tracked device 104. In response to receiving the request, request detector 202 may provide a control signal to multiplexer 206 that selects the output of variable delay 204. Moreover, the received request may be reflected and provided to an input of variable delay 204. In this way, request detector 202 filters incoming messages and is configured to reflect messages that are RTT messages such as or proximity detection requests.

In various embodiments, in response to request detector 202 identifying the request, delay generator 128 may generate a designated delay value and time delay value and provide the designated delay value and its associated time delay value to delay control 126. In one example, delay control 126 provides the designated delay to variable delay 204. In this way, variable delay 204 is provided with the reflected message that is to be transmitted as well as the designated delay that is to be applied to the transmission of the message. Accordingly, variable delay 204 is configured to implement the designated delay and wait a designated period of time before providing a message for transmission to multiplexer 206 and second transmitter 120 for transmission. In this way, a message may be reflected with a designated delay that is determined in a deterministic manner, as may be accomplished with a key. In various embodiments, request detector 202 and variable delay 204 include analog and/or digital processing logic and circuitry configured to implement the request handling and delay implementation described herein. Moreover, multiplexer 206 may be implemented in a digital logic device. In some embodiments, multiplexer 206 may have other inputs to support routing of other signals to second transmitter 120, such as those received from other components of a Bluetooth system that may be associated with device specific data or security information exchange. As similarly discussed above, components such as request detector 202, variable delay 204, and multiplexer 206 may be implemented in a second logic device of tracked device 104, as similarly discussed above with reference to FIG. 1.

Figure 3:
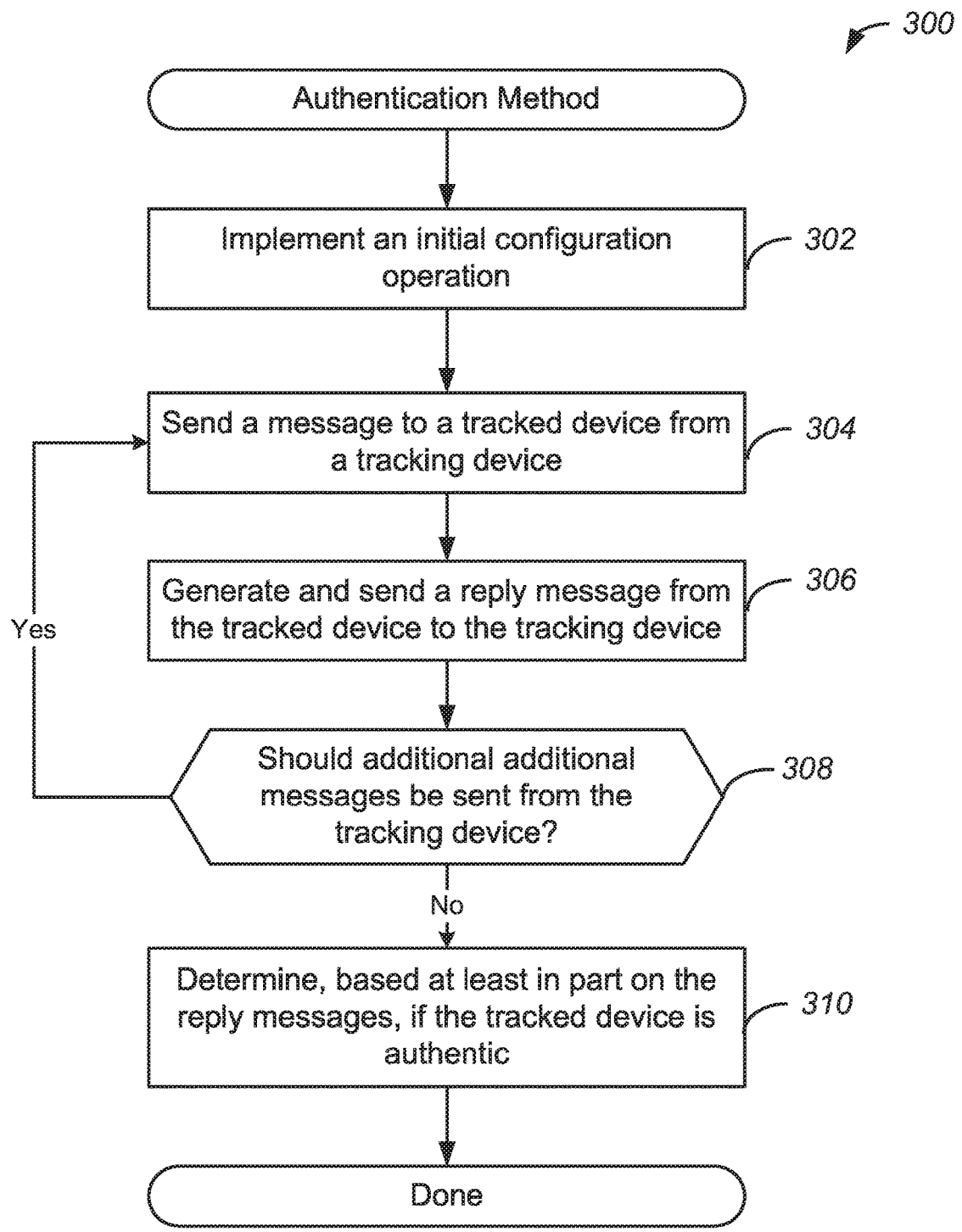
FIG. 3 illustrates an example of a method for secure authentication between a tracking device and one or more tracked devices, implemented in accordance with some embodiments.

FIG. 3 illustrates an example of a method for secure authentication between a tracking device and one or more tracked devices, implemented in accordance with some embodiments. As discussed above, the tracking device and tracked device may be configured to implement one or more delays in transmission and reflection of a signal to provide additional security and authentication between the tracking device and the tracked device. In this way, the tracking device is able to accurately identify and locate the tracked device with increased security and protection from other devices that may attempt to spoof or copy the identity of the tracked device.

Method 300 may commence with operation 302 during which an initial configuration operation may be implemented. As similarly discussed above, the initial configuration operation may include the exchange of a secure key, and may be implemented during the initial pairing of the tracking device and tracked device, or during a subsequent synchronization event. Accordingly, the key may be unique to the pair of the tracking device and a particular tracked device.

Method 300 may proceed to operation 304 during which a message may be sent from the tracking device to a tracked device. As discussed above, the message may include a request for a reply from the tracked device. Accordingly, the message may be received at the tracked device as part of a proximity detection request.

Method 300 may proceed to operation 306 during which a reply message may be generated and sent from the tracked device to the tracking device. As discussed above, the tracked device may compute and implement a delay prior to sending the reply message back to the tracking device. The delay may be computed based on the key that was exchanged during operation 302.

Method 300 may proceed to operation 308 during which it may be determined if additional messages should be sent from the tracking device. As discussed above, multiple messages may be used for the purposes of authentication. For example, a series of five messages may be used as the basis of authentication, as will be discussed in greater detail below. Accordingly, the tracking device may be configured to send a designated number of messages for each authentication process. In one example, the tracking device may be configured to include a state machine that monitors how many messages have been sent, and may determine when all messages have been sent. Accordingly, if it is determined that additional messages should be sent, method 300 may return to operation 304. If it is determined all messages have been sent, method 300 may proceed to operation 310.

Method 300 may proceed to operation 310 during which it may be determined if the tracked device is authentic. In various embodiments, the tracking device may receive the reply messages from the tracked device. Moreover, the tracking device is configured to compute a time delay value and a designated delay value for each received reply message as well as a corrected RTT for each received reply message. As discussed above, the designated delay value will be determined in a complimentary manner as those determined by the tracked device. More specifically, the designated delay values computed by the tracking device will be determined based off of the shared key and in a deterministic manner, so they will be the same as those implemented by the tracked device if the tracked device is authentic.

Accordingly, the tracking device may determine a time delay value, an associated designated delay value, and a corrected RTT for each received reply message. As will be discussed in greater detail below, the tracking device may then use the computed values to determine if the values converge on a same round trip time and/or distance within an accepted error. For example, a first reply message may have a first delay as well as a first corrected RTT which can be translated to a first distance. A second reply message may have a second delay as well as a second corrected RTT which can be translated to a second distance. Moreover, a third reply message may have a third delay as well as a third corrected RTT which can be translated to a third distance. In this example, if the first, second, and third delays implemented by the tracked device when generating the reply messages match the first, second, and third delays determined by the tracking device, then the computed corrected RTTs should be the same or within an accepted margin of error, and the computed distances should be the same or within an accepted margin of error. If the tracked device is not authentic, and the time delay values and designated delay values do not match, or if the tracked device has not implemented time delay values and designated delay values, then the computed distances will vary and not be the same. In this way, and as will be discussed in greater detail below, the computed delay times and distances may be used to determine if the tracked device is authentic, and an authenticity metric may be generated that characterizes whether or not the tracked device is authentic.

As discussed above, method 300 and its associated operations can be implemented by processing logic comprising hardware (circuitry, dedicated logic, etc.), software (such as is run on a general purpose computing system or a dedicated machine), firmware (embedded software), or any combination thereof. In various embodiments, method 300 is performed by tracking device 102 and tracked device 104 described above with reference to FIG. 1 and FIG. 2. For example, operation 304 may utilize first processor 132 and first transceiver 106, and operation 306 may utilize delayed reflector 124, delayed control 126, delay generator 128, and second transceiver 118 among other components of tracked device 104. Moreover, operations 308 and 310 may utilize at least first processor 132.

Figure 4:
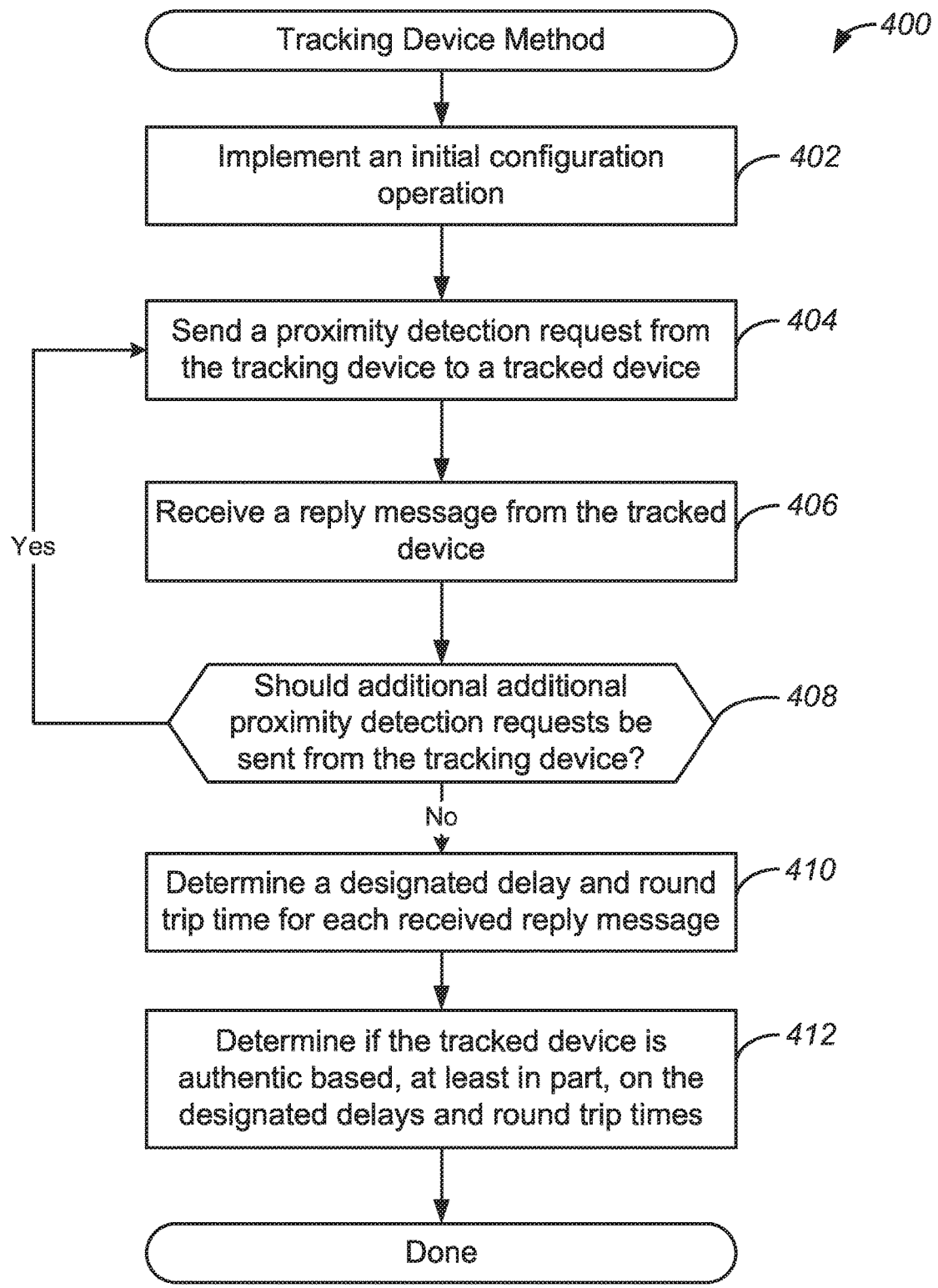
FIG. 4 illustrates another example of a method for secure authentication between a tracking device and one or more tracked devices, implemented in accordance with some embodiments.

FIG. 4 illustrates another example of a method for secure authentication between a tracking device and one or more tracked devices, implemented in accordance with some embodiments. As discussed above, the tracking device and tracked device may be configured to implement one or more delays in transmission and reflection of a signal to provide additional security and authentication between the tracking device and the tracked device. As will be discussed in greater detail below, the tracking device is configured to implement one or more computations to determine if the tracked device is authentic.

Method 400 may commence with operation 402 during which an initial configuration operation may be implemented. As discussed above, the initial configuration operation may include the exchange of a secure key, and may be implemented during the initial pairing of the tracking device and tracked device, or during a subsequent synchronization event. Accordingly, the key may be unique to the pair of the tracking device and a particular tracked device, and during operation 402 the key may be received at the tracking device and the tracked device.

Method 400 may proceed to operation 404 during which a proximity detection request may be sent from the tracking device to a tracked device. As discussed above, the proximity detection request may be message that includes a request for a reply from the tracked device as well as various identifying information associated with the tracked device, such as a unique identifier.

Method 400 may proceed to operation 406 during which a reply message may be received at the tracking device. Accordingly, as discussed above, the reply message may be generated and sent from the tracked device to the tracking device, and the tracking device may store the reply message in a memory for subsequent use.

Method 400 may proceed to operation 408 during which determined if additional proximity detection requests should be sent from the tracking device. As discussed above, multiple messages may be used for the purposes of authentication, and the tracking device may be configured to send a designated number of messages for each authentication process. Accordingly, if it is determined that additional messages should be sent, method 400 may return to operation 404. If it is determined all messages have been sent, method 400 may proceed to operation 410.

Method 400 may proceed to operation 410 during which a designated delay and a round trip time and/or distance may be computed for each received message. Accordingly, as discussed above, a series of designated delays mat be determined in a deterministic manner for the received messages. The number of designated delays may have been previously determined as part of an initial configuration of the tracking device. For example, the tracking device may have been configured to send a total of six requests for an authentication process, and the tracking device may have been further configured to determine six designated delays, one corresponding to each of the six requests/replies. As discussed above, the designated delays are generated in a complimentary manner between a tracking device and an authentic tracked device.

Accordingly, for each received reply, the tracking device determines a designated delay as well as a corrected RTT. Based on known physical properties of the propagation of radio transmissions, such as a known speed of the transmission of such frequencies, the corrected RTT may be converted to a physical distance for each reply. In this way, the tracking device may compute a delay, an RTT, and a distance for each reply message that has been received.

Method 400 may proceed to operation 412 during which the tracking device may determine if the tracked device is authentic based on the determined delays and round trip times and/or distances. In various embodiments, the series of messages sent and received during the authentication process may occur over a small period of time, and there should be little movement of the tracked device during this time. Accordingly, if the tracked device is authentic, the computed distances should be similar if not the same. Accordingly, the tracking device may be configured to determine if the tracked device is authentic based on a variance associated with the computed corrected RTT times and/or computed distances. More specifically, a standard deviation may be taken across the computed corrected RTT times. The standard deviation may be compared with a designated threshold (e.g., a designated threshold value). If the standard deviation is above the threshold, the tracked device is identified as inauthentic and authentication fails. If the standard deviation is below the threshold, the tracked device is identified as authentic, and authentication is successful. The result of the authentication computation is represented as an authenticity metric. As stated above, while such computations are described with reference to the corrected RTT times, such authentication computations may also be implemented using their derived distances.

As discussed above, method 400 and its associated operations can be implemented by processing logic comprising hardware (circuitry, dedicated logic, etc.), software (such as is run on a general purpose computing system or a dedicated machine), firmware embedded software), or any combination thereof. In various embodiments, method 400 is performed by tracking device 102 described above with reference to FIG. 1. For example, operations 402, 404, 406, 408 and 412 may utilize first processor 132 and first transceiver 106. Moreover, operation 410 may utilize at least ToF analyzer 112, delay compensator 114, and delay generator 116.

Figure 5:
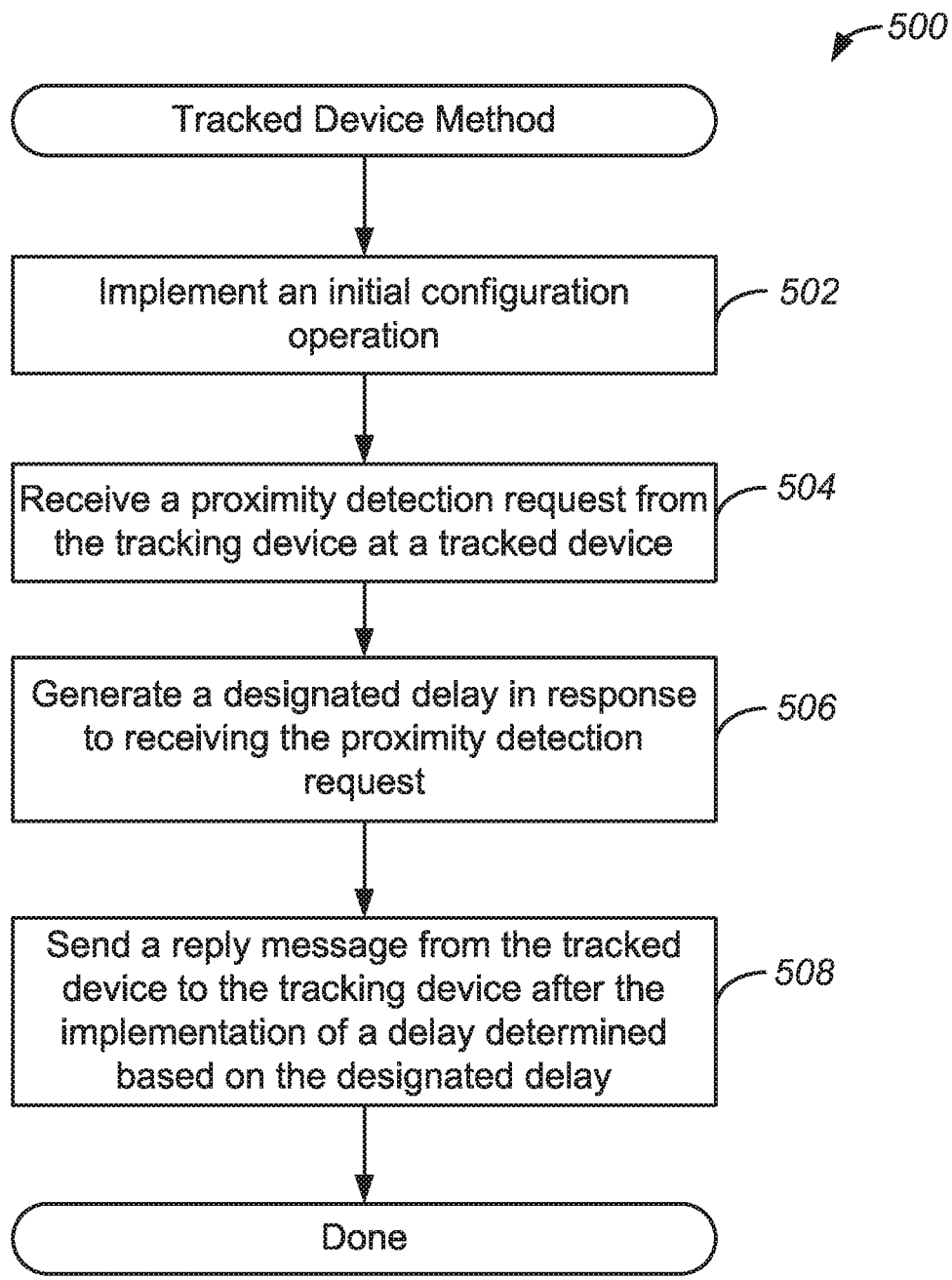
FIG. 5 illustrates yet another example of a method for secure authentication between a tracking device and one or more tracked devices, implemented in accordance with some embodiments.

FIG. 5 illustrates yet another example of a method for secure authentication between a tracking device and one or more tracked devices, implemented in accordance with some embodiments. As discussed above, the tracking device and tracked device may be configured to implement one or more delays in transmission and reflection of a signal to provide additional security and authentication between the tracking device and the tracked device. As will be discussed in greater detail below, the tracked device is configured to implement one or more designated delays in the reply to a tracking device, and such delays may be used to determine if the tracked device is authentic.

Method 500 may commence with operation 502 during which an initial configuration operation may be implemented. As similarly discussed above, the initial configuration operation may include the exchange of a secure key, and may be implemented during the initial pairing of the tracking device and tracked device, or during a subsequent synchronization event. Accordingly, the key may be unique to the pair of the tracking device and a particular tracked device.

Method 500 may proceed to operation 504 during which a proximity detection request may be received at the tracked device. As discussed above, the request may be broadcast from the tracking device and may be sent as part of a proximity detection and authentication process. As will be discussed in greater detail below, in response to receiving the request, the tracked device may generate a reply.

Accordingly, method 500 may proceed to operation 506 during which a designated delay associated with the reply may be generated. Accordingly, the tracked device may use the key received at operation 502 to generate a designated delay in the previously described deterministic manner.

Method 500 may proceed to operation 508 during which the reply message may be sent from the tracked device to the tracking device. As discussed above, the tracked device may compute and implement a delay prior to sending the reply message back to the tracking device such that the round trip time measured by the tracking device includes the implemented delay.

As discussed above, method 500 and its associated operations can be implemented by processing logic comprising hardware (circuitry, dedicated logic, etc.), software (such as is run on a general purpose computing system or a dedicated machine), firmware (embedded software), or any combination thereof. In various embodiments, method 500 is performed by tracked device 104 described above with reference to FIG. 1 and FIG. 2. For example, operation 502 may utilize second processor 136. Moreover, operation 504 may utilize second transceiver 118 and delayed reflector 124. Operation 506 and 508 may utilize delayed reflector 124, delayed control 126, delay generator 128, and second transceiver 118. As discussed above, operations utilizing delayed reflector 124 may be implemented by utilizing request detector 202, variable delay 204 and multiplexer 206.

Although the foregoing concepts have been described in some detail for purposes of clarity of understanding, it will be apparent that certain changes and modifications may be practiced within the scope of the appended claims. It should be noted that there are many alternative ways of implementing the processes, systems, and devices. Accordingly, the present examples are to be considered as illustrative and not restrictive.

What is claimed is:

1. A method of a tracking device comprising:
   transmitting, using a transceiver of the tracking device, a plurality of proximity detection requests;
   receiving, at the transceiver, a plurality of reply messages from a tracked device;
   generating a plurality of designated delay values using a shared key shared between the tracking device and the tracked device;
   determining a plurality of round trip times associated with the plurality of reply messages based, at least in part, on the plurality of designated delay values and time stamps associated with the plurality of reply messages;
   determining an amount of variance in the plurality of round trip times; and
   generating, using a processor, an authenticity metric associated with the tracked device based, at least in part, on the amount of variance in the plurality of round trip times, wherein, based on the amount of variance of the plurality of round trip times being below a threshold value, the authenticity metric indicates that the tracked device used the shared key to generate the plurality of designated delay values to provide the reply messages.

2. The method of claim 1, wherein the shared key is shared between the tracking device and the tracked device during a synchronization event, and wherein the plurality of designated delay values is generated deterministically based on the shared key.

3. The method of claim 1, wherein the determining of the plurality of round trip times further comprises:
   determining a plurality of corrected round trip times adjusted based on the plurality of designated delay values.

4. The method of claim 3, wherein the authenticity metric is determined based on a standard deviation of the plurality of corrected round trip times and a designated threshold value.

5. The method of claim 4 further comprising:
   determining that the tracked device is authentic in response to determining that the standard deviation is less than the designated threshold value.

6. The method of claim 1, wherein the time stamps identify a time at which each proximity detection request was transmitted from the tracking device, and further identify a time at which each corresponding reply was received at the tracking device.

7. The method of claim 1, wherein the plurality of proximity detection requests comprises Bluetooth packets.

8. A method comprising:
   at a transceiver of a tracked device:
      receiving a plurality of proximity detection requests from a tracking device,
      generating a plurality of designated delay values characterizing delays to be applied to reply messages,
      generating a plurality of reply messages based on the plurality of proximity detection requests, and
      transmitting, using the transceiver, the plurality of reply messages after implementing a plurality of delays determined based on the plurality of designated delay values; and
   at a transceiver of the tracking device:
      receiving the plurality of reply messages,
      determining a plurality of round trip times based, at least in part, on the plurality of designated delay values and time stamps associated with the plurality of reply messages, and
      generating an authenticity metric based, at least in part, on an amount of variance in the plurality of round trip times, wherein based on the amount of variance of the plurality of round trip times being below a threshold value, the authenticity metric indicates that the tracked device implemented the plurality of delays determined based on the plurality of designated delay values.

9. The method of claim 8, wherein the plurality of designated delay values is generated based on a shared key that is shared between the tracking device and the tracked device.

10. The method of claim 9, wherein the plurality of designated delay values is generated deterministically based on the shared key.

11. The method of claim 9 further comprising:
    receiving, at the transceiver of the tracked device, the share key during a synchronization event.

12. A system comprising:
a tracking device configured to generate a plurality of proximity detection requests, the tracking device comprising:
a first transceiver;
a first delay generator comprising processing circuitry configured to generate a plurality of designated delay values using a shared key;
a delay compensator comprising processing circuitry configured to determine a plurality of round trip times based, at least in part, on the plurality of designated delay values and time stamps associated with a plurality of reply messages;
a first processor configured to generate an authenticity metric based, at least in part, on an amount of variance in the plurality of round trip times, wherein the authenticity metric indicates, based on the amount of variance of the plurality of round trip times being below a threshold value, that delays corresponding to the designated delay values were applied to the reply messages using the shared key; and
a tracked device configured to generate the plurality of reply messages responsive to the plurality of proximity detection requests, the tracked device comprising:
a second transceiver;
a second delay generator comprising processing circuitry configured to generate the plurality of designated delay values using the shared key:
a delay control comprising processing circuitry configured to identify a designated delay value associated with each of the plurality of reply messages; and
a delayed reflector comprising processing circuitry configured to generate a plurality of reply messages each being delayed based on the identified designated delay values.

13. The system of claim 12, wherein the shared key is shared between the tracking device and the tracked device during a synchronization event.

14. The system of claim 12, wherein the plurality of designated delay values is generated deterministically based on the shared key.

15. The system of claim 12, wherein a sequence of delays applied during the generation of the plurality of reply messages is determined based on the plurality of designated delayed values.

16. The system of claim 15, wherein the determining of the plurality of round trip times further comprises determining a plurality of corrected round trip times by adjusting the plurality of round trip times based on the plurality of designated delay values.

17. The system of claim 16, wherein the authenticity metric is determined based on a standard deviation of the plurality of corrected round trip times and a designated threshold value.

* * * * *